Nov. 20, 1934.  F. C. MATTHEWS ET AL  1,981,059
METHOD OF CUTTING TUBES INTO LENGTHS AND APPARATUS THEREFOR
Filed May 2, 1933   5 Sheets-Sheet 1

Patented Nov. 20, 1934

1,981,059

UNITED STATES PATENT OFFICE 1,981,059

METHOD OF CUTTING TUBES INTO LENGTHS AND APPARATUS THEREFOR

Frank Courtenay Matthews, Frederick Edward Brown and John William Henry Pengelly, London, England, assignors to The India Rubber, Gutta Percha and Telegraph Works Company Limited, London, England, a British company Application May 2, 1933, Serial No. 669,042
In Great Britain May 9, 1932

19 Claims. (Cl. 164—34)

This invention consists of improvements in or relating to methods of cutting tubes into lengths, and apparatus therefor. The invention is particularly applicable to cutting tubes of plastic material, e. g. unvulcanized rubber, into lengths for use as blanks in the manufacture of hollow rubber articles, e. g. rubber balls, although it is not restricted thereto.

In the manufacture of such hollow articles, the tube issues from an extruding machine, and the present invention has for one of its objects to enable a tube to be cut into lengths constituting blanks of a desired size, while the tube is moving away from the extruding machine. Another object is to provide for closing such a length of tube between its ends, thereby defining two blanks, and simultaneously forming one joint of each of the two blanks, the said length of tube being completely or partially severed during the formation of the joints.

According to the invention, a method of cutting into lengths a tube, e. g. of plastic material such as unvulcanized rubber issuing from an extruding machine, moving in the direction of its length, by means of a plurality of cutters mounted at opposite sides of, and directed towards the tube with their cutting edges lying transversely of the tube, comprises the step of imparting to the cutters a motion of translation in the direction of movement of the tube during the cutting operation in order to prevent the material of the tube from becoming piled up in front of the cutters, and thereby impairing the shape of the tube.

According to a feature of the invention, the cutters are advanced in unison into the wall of the tube and thereby sever or substantially sever the latter.

In order completely to separate a severed length of the tube, the said motion of translation of the cutters at or near the end of the cutting stroke may be effected at a rate of speed greater than that of the endwise movement of the tube.

According to another feature of the invention, the tube is severed or substantially severed by pinching its wall together, for example, at a situation midway between its ends. Such a tube is preferably of short length, and the two cut portions thereof may be used as blanks in the manufacture of hollow rubber articles, as described hereinafter.

The invention also provides apparatus for cutting tubes into lengths, comprising a frame, a plurality of cutters, e. g. three, slidably mounted thereon at opposite sides of, and directed, e. g. radially, towards an axis substantially co-axial with the longitudinal axis of the tube, the, e. g. curved, cutting edges of which cutters lie transversely of, e. g. at right angles to, said axis, and cutter-actuating means for advancing the several cutters, e. g. in unison, towards and retracting the same, e. g. in unison, away from the said axis.

The frame aforesaid, preferably circular, carrying the cutters, may be mounted to move in the direction of length of said axis, and reciprocatory means may be arranged to reciprocate the frame in said direction, for imparting to the cutters a motion of translation in the direction of movement of the tube during the cutting operation, the cutter-actuating means being arranged to advance the cutters while they are being moved by the reciprocatory means in the direction of feed of the tube.

In order completely to sever a cut length from the tube, the reciprocatory means may be arranged to impart to the cutters at the end of their cutting stroke, a motion of translation in the direction of feed of the tube at a rate of speed greater than the feed of the tube.

According to another feature of the invention, apparatus as set forth above may comprise a device wherein two cutters in the form of opposed press dies mounted in a frame to reciprocate towards and away from one another at opposite sides of the tube or a length cut therefrom, are arranged to pinch and thereby close the tube or tube length and sever or substantially sever it. This device is particularly adapted for making rubber tubular blanks closed at one end, for use in the manufacture of hollow rubber articles.

Conveniently the cutter-actuating means serving for reciprocating two cutters constituted by press dies towards and away from one another comprises rotary toothed gearing operatively connected with said cutters, and means for adjusting the connection of one of the cutters with the gearing in relation to the connection of the other cutter therewith.

Other features of the invention will be described hereinafter and pointed out in the claims.

One embodiment of the invention is diagrammatically illustrated by way of example in the accompanying drawings, wherein.

Like reference characters designate like parts throughout the several views.

Figure 3:
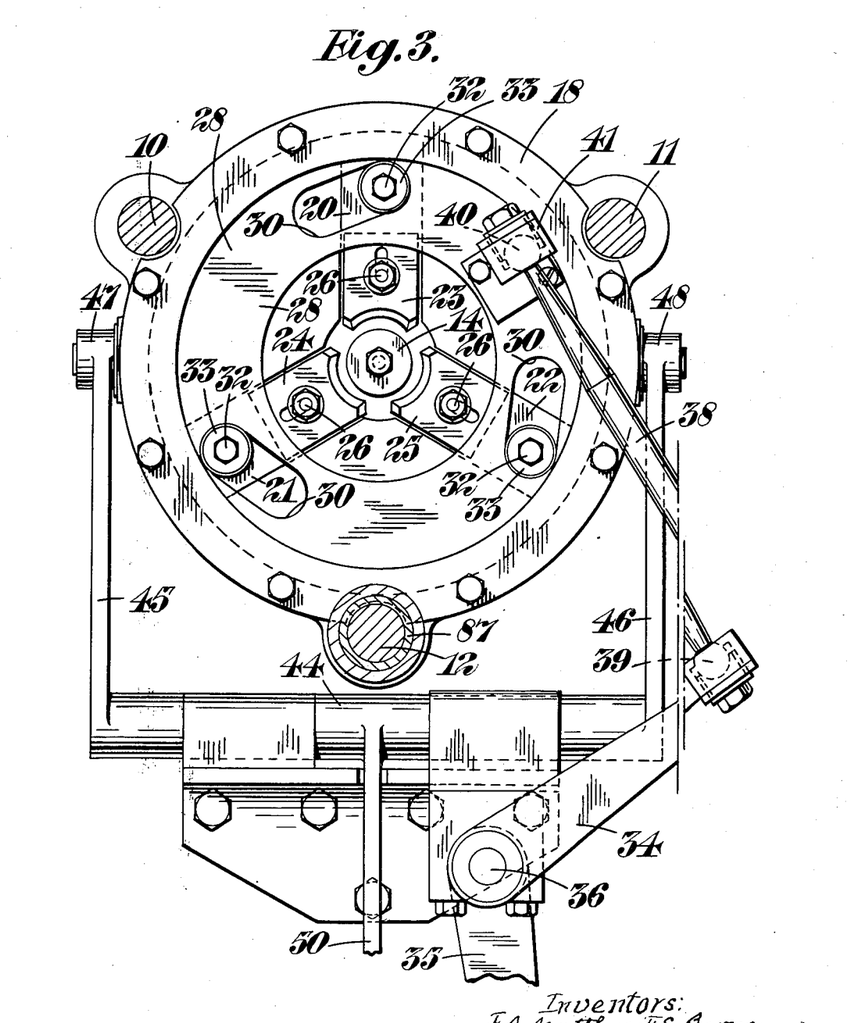
Figure 3 is a vertical sectional elevation taken on the line 3—3 in Figure 4, showing one of the cutting devices.

Referring to the drawings, the framework of the apparatus comprises three rods 10, 11, 12 arranged parallel with a mandrel 14 along which a tube 15 of unvulcanized rubber, indicated in broken lines, moves as it issues from the nozzle 16 of an extruding machine. An annular frame 18 which is shown most clearly in Figures 3 and 4 and is slidable along said rods has the axis of said mandrel and tube at its centre. Three cutter guide plates 20, 21, 22 spaced 120° apart, extend radially on said frame towards the mandrel, and three cutters 23, 24, 25 are movable endwise towards and away from the mandrel, each cutter being adjustably mounted on its guide plate by a nut-equipped stud 26. A ring 28 rotatable on the frame 18 has three cam portions in the form of cam slots 30 with each of which each one of the cutter plates is connected by a stud 32 equipped with a ball bearing 33, as clearly shown in Figure 4. Any convenient means may be provided for imparting angular movement to the ring 28 and thereby advancing and retracting the cutters so as to sever or substantially sever the tube on the mandrel.

In the construction illustrated the means for rotating the ring 28 comprises a lever 34, 35 mounted to rock at 36 on the framework about an axis parallel with the axis of the tube, one arm 34 of which lever is so connnected to the ring as to permit the latter to move towards and away from the lever while it is being rotated during the reciprocatory movement of the annular frame 18 on the rods 10, 11, 12. As shown a connecting rod 38 has one end connected by a ball-and-socket joint 39 to one end of the lever arm 34, and its other end connected by a like joint 40 to a bracket 41 on the ring 28.

This reciprocatory movement of the frame 18 is effected by reciprocatory means comprising a rock shaft 44 carrying two arms 45, 46 pivoted to the frame 18 at situations 47, 48, respectively, lying at opposite sides thereof on a line of pivoting intersecting the longitudinal axis of the mandrel 14. This rock shaft 44 also carries one end of a lever arm 50 whereof the other end carries a follower 51 controlled by a face cam 52 mounted on a cam shaft 53 lying transversely of the direction of length of the mandrel 14. This cam shaft 53 also carries a cylinder cam 54 controlling a follower 55 on the end of the arm 35 of the lever 34, 35 for rotating the cutter ring 28.

There are thus two cams 52, 54, one, 52 for controlling the reciprocatory means comprising the rock shaft 44, and a second 54, for controlling the cutter-actuating means comprising the ring 28, which cams 52, 54 are mounted to rotate at the same speed about an axis lying transversely of the direction of feed of the tube along the mandrel 14.

The cutting edges of the cutters, 23, 24, 25 are each bevelled and lie in one plane situated transversely of the longitudinal axis of the tube, and when closed upon the mandrel in their cutting position, extend nearly or completely all round the same so as to sever or substantially sever the tube.

Also mounted to reciprocate on the three rods 10, 11, 12, is a second frame 60 having six sides, and comprising two vertical guide rods 62, 63, spaced apart at opposite sides of the longitudinal axis of the tube. Two cross heads 64, 65 slidable on these guide rods carry each a cutter in the form of press dies 66, 67 respectively, which are thus mounted to reciprocate towards and away from one another at opposite sides of the tube or a length cut therefrom, and are arranged to pinch and thereby close the tube or tube length and sever or substantially sever it.

Cutter-actuating means for reciprocating these press dies 66, 67, is constituted by rotary toothed gearing comprising two toothed racks 68, 69, secured respectively to the cross-heads 64, 65 and thus allotted each to one of the press dies 66, 67, and two rotary toothed members constituted by segments 70, 71, meshing respectively with said racks 68, 69. The segment 70 is carried by one end of a short shaft 72, whereof the other end carries a similar toothed segment 73. The segment 71 is carried by an axle 74 which also carries a gear wheel 76 that meshes with the segment 73 and can thus drive the segment 70. The gear wheel 76 is a mutilated gear wheel and carries two lugs 77, 78 each provided with a set screw between adjacent ends of which is clamped an arm 79 of the toothed segment 71. This segment is mounted co-axially with the gear wheel 76 and is arranged to be driven by it, but is also adjustable angularly in relation to it. This toothed gearing is actuated by a cylinder cam 80 that is fast on the cam shaft 53 and controls a follower 82 carried by one end of a lever arm 84 journaled at 85 on the framework. The other end of this lever arm 84 is formed as or is operatively connected to a toothed member in the form of a segment 86 meshing with the gear wheel 76.

Figure 4:
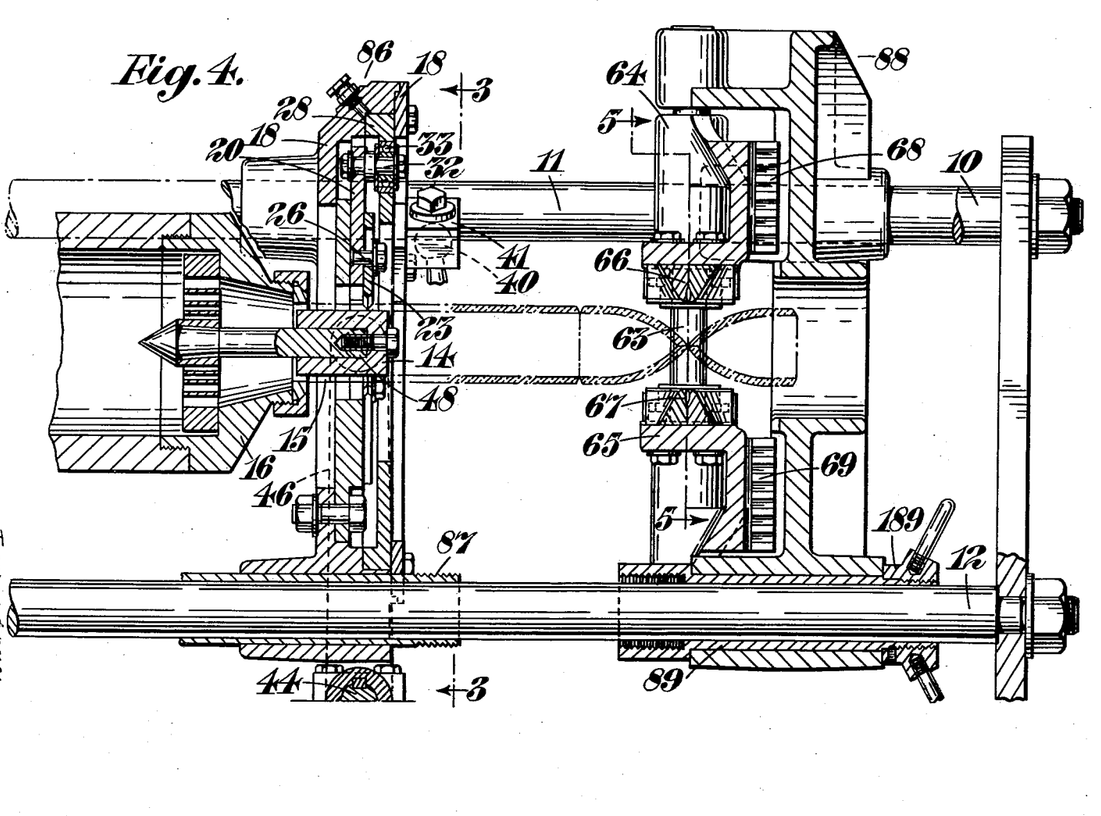
Figure 4 is a vertical longitudinal section taken through the two cutting devices, shown spaced apart a greater distance than as shown in Figure 1.

There are thus two cutting devices designated generally 86 and 88 and shown spaced apart in Figure 4, although the apparatus may comprise only the first cutting device. The cutting device 86 comprises three cutters and the cutting device 88 comprises cutters in the form of press dies, the cutters of the two devices being mounted to reciprocate side by side (on said rods) for use in apparatus for making hollow articles from a length of tubing. The first cutting device serves for cutting into lengths the tube while it is moving in the direction of its length, and the second device 88 is arranged to close each length between its ends, for example midway between its ends, the length being severed at the point of closing. The said first and second cutting devices 86 and 88 are operated in timed relation one with the other. They may operate simultaneously to sever the tube and to close the severed length between its ends, respectively, or, alternatively, the operation of the two devices may be so timed that the closure of the length between its ends may take place before or after the length is severed from the main portion of the tube. Preferably, the closure is effected momentarily before the length is severed from the main part of the tube.

The three cutters 23, 24 and 25 are advanced in unison into the wall of the tube, and at the same time have imparted to them a motion of translation in the direction of movement of the tube, and so prevent the material of the tube from becoming piled up in front of the cutters which would impair the shape of the tube. In order completely to sever the cut end of the tube, the said motion of translation of the cutters at or near the end of the cutting stroke is effected at a rate of speed greater than that of the feed of the tube. When the severed end of the tube reaches the second cutting device 88, it is severed or substantially severed at or near the middle of its length owing to its wall being pinched together by the opposed press-dies 66 and 67, as described hereinafter.

Figure 1:
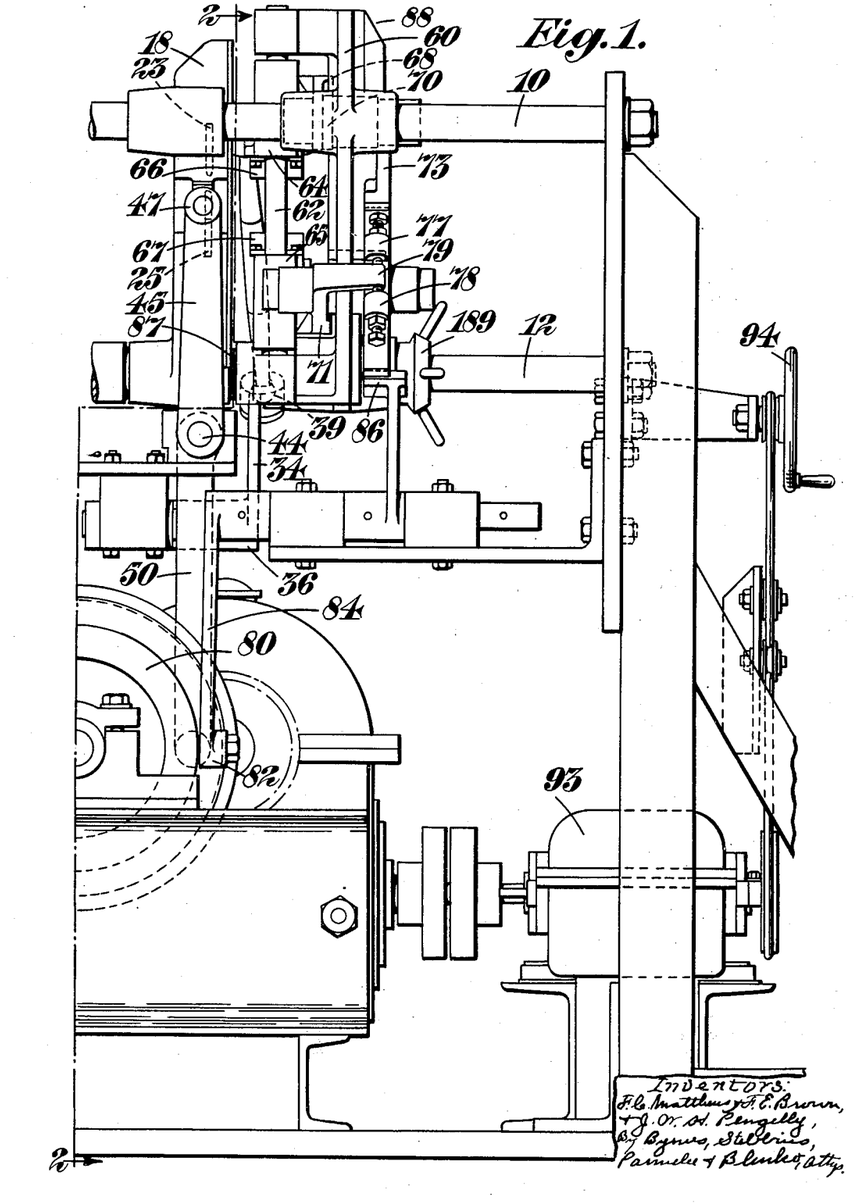
Figure 1 is a side elevation showing one form of machine according to the invention comprising two tube-cutting devices.
Figure 2:
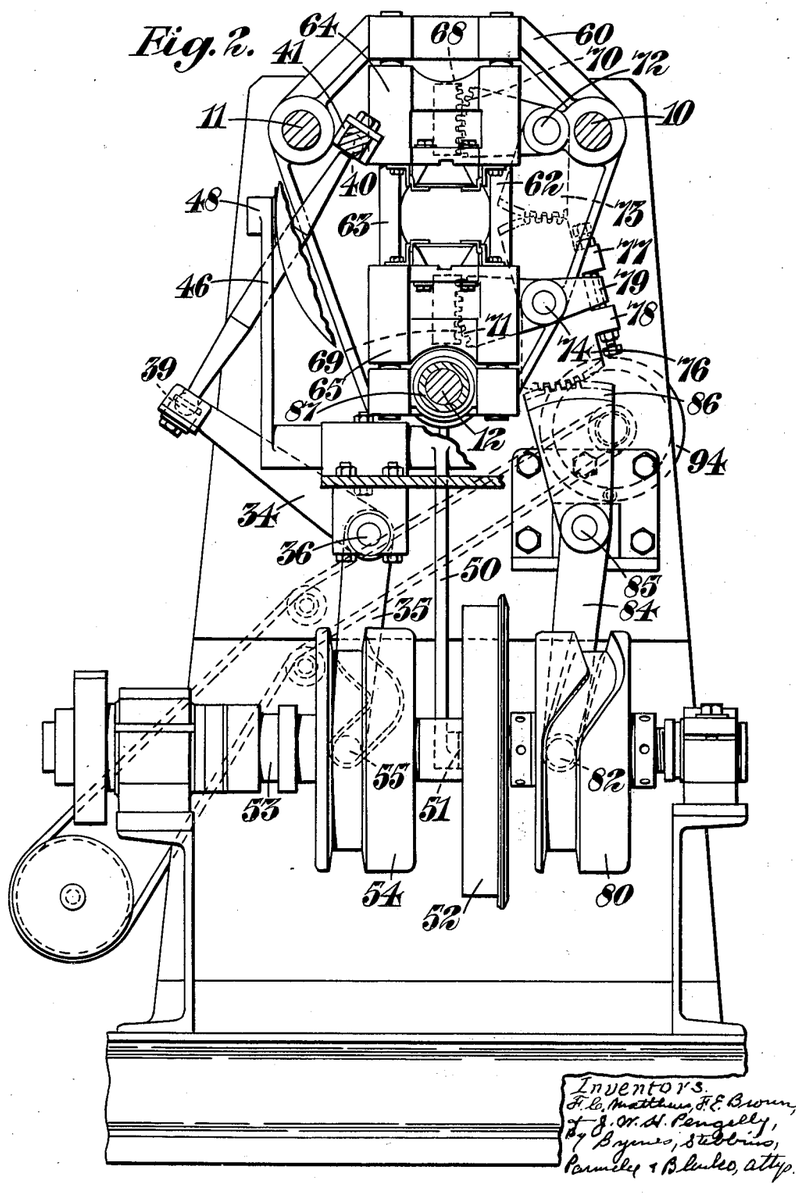
Figure 2 is a sectional elevation thereof taken on the bent line 2—2 in Figure 1.

The two cutting devices 86, 88 may have a frame common to them both, or alternatively, the frames 18, 60 of the two devices may be rigidly connected together. As illustrated most clearly in Figure 4, these frames may be connected together by a screwed sleeve connection slidable on the rod 12, so that both frames are mounted to reciprocate in unison in the direction of the length of the tube to be severed by them. This sliding connection comprises a sleeve 87 attached to the frame 86 and having its end in screw-threaded engagement with one end of a second sleeve 89 which extends through the frame 88 and carries on its other end a manually adjustable nut 189. By turning the latter, the distance apart of the two frames 86 and 88 can be adjusted. In general the frame will be situated close to the frame 86, as shown in Figure 1, but if desired, a spacing sleeve can be placed on the rod 12 between them.

When the two frames 86 and 88 are connected together, the cam 52 serves to reciprocate them, and the other two cams 54 and 80 serve respectively to operate in unison the cutter-actuating means of the two devices.

The two opposed press dies 66, 67 are bevelled along curved lines to enable them to press together the contiguous edges of severed or substantially severed portions of the tube length to effect sealing of the said edges, and each is provided with an edge which forms, with the bevel, a cutting edge 166 and 167, respectively, to bite away the portions of the tube length that are not intended to remain a part of the finished blank, which dies are so formed and arranged that the tube length between them can be bitten between its ends and severed or substantially severed to provide on the bitten edges at the adjacent ends of the severed portions a convex periphery.

Figure 6:
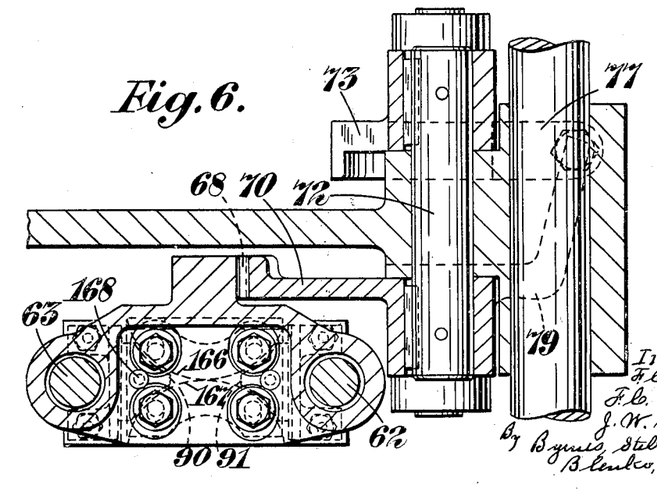
Figure 6 is a horizontal section taken on the line 6—6 in Figure 5.

In the construction illustrated, each press die has two convex cutting edges 166 and 167 (see Figure 6) which lie close together, contacting one another or merging one into the other in reverse positions with their concavities facing in opposite directions so that, as viewed in plan, they substantially form an X, as indicated in broken lines in Figure 6.

Figure 5:
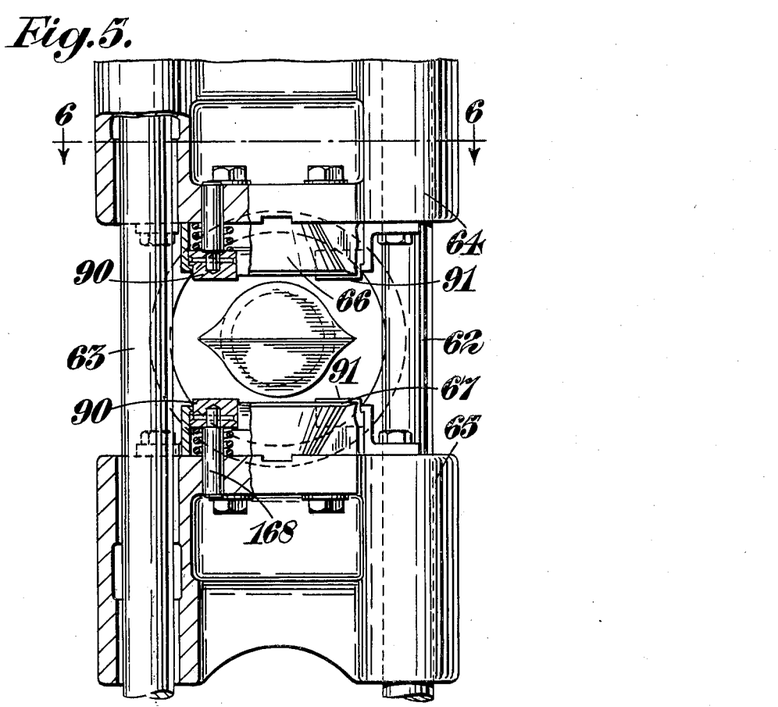
Figure 5 is a vertical sectional elevation taken on the bent line 5—5 in Figure 4.

In order to remove the superfluous material that is bitten off or spewed out laterally, two press members 90, 91 are arranged one at each side of the press dies 66, 67 in the V-shaped portions thereof, as shown most clearly in Figures 5 and 6. Each of these press members is guided to move vertically against a spring on a pin 168 secured to the crosshead.

The cam shaft 53 may be driven in any convenient manner, preferably by a drive comprising variable speed gear 93, and in order to accommodate variations of flow of the rubber from the extruding machine, by regulating the time interval between each cutting operation, a manual control of the variable speed gear comprising a hand wheel 94 is arranged in a convenient position on the framework near the two cutting devices. When the handwheel 94 is turned, the variable speed gear 93 is adjusted to alter the speed of the drive.

The invention thus provides a method of making rubber blanks from tube lengths for use in the manufacture of hollow rubber articles, comprising the step of closing the wall of the tube together at a situation, e. g. midway between its ends by biting the tube length and severing or substantially severing the same and closing the adjacent ends of the severed parts.

A line of closure intersects the central longitudinal axis of the tube length, and is curved in arcuate form.

By means of the described apparatus the closure is effected along two curved lines, each being an arc having a chord at right angles to, and bisected by, the central longitudinal axis of the tube. Also the contiguous edges of the blanks are pressed firmly together to form sealed or welded joints simultaneously with the closing in of the wall of the tube length by the press dies.

These rubber blanks having sealed or welded joints are formed by the second cutting device from a tube length which is cut by the first cutting device from an extruded rubber tube while it is moving from the extruding machine.

It will be appreciated from the above that the described machine comprising the two cutting devices adjustable towards and away from one another, enables a tube to be automatically cut into lengths constituting blanks of a desired size, while the tube is moving away from an extruding machine, and further enables such a tube blank to be closed between its ends, thereby defining two shorter blanks, one joint of each of these shorter blanks being formed at the same time as the longer blank is being completely or partially severed.

Various modifications may be made in the details of construction described above without departing from the invention. For example, the first cutting device 86 may comprise more than three cutters.

We claim:—

1. A method of cutting into lengths, a tube that is moving in the direction of its length, by means of a plurality of cutters mounted on opposite sides of and directed towards the tube with their cutting edges lying transversely of the tube, comprising the step of imparting to the cutters a motion of translation in the direction of movement of the tube during the cutting operation, which motion of translation of the cutters at or near the end of the cutting stroke is effected at a rate of speed greater than that of the endwise movement of the tube.

2. Apparatus for cutting into lengths a tube moving in the direction of its length, comprising in combination a frame mounted to move in a direction parallel with the direction of feed of the tube, reciprocatory means arranged to reciprocate said frame in said direction, a plurality of cutters movably mounted on said frame at opposite sides of, and directed towards an axis substantially co-axial with the longitudinal axis of the tube, the cutting edges of which cutters lie transversely of said axis, and cutter-actuating means arranged to advance the several cutters towards said axis while they are being moved by the reciprocatory means in the direction of feed of the tube, which reciprocatory means is arranged to impart to the cutters at the end of their cutting stroke a motion of translation in the direction of feed of the tube at a rate of speed greater than the feed of the tube.

3. Apparatus for cutting a tube into lengths, comprising in combination a frame mounted to move in a direction parallel with the direction of feed of the tube, reciprocatory means arranged to reciprocate said frame in said direction, a plurality of cutters movably mounted thereon at opposite sides of, and directed towards an axis substantially co-axial with the longitudinal axis of the tube to be cut, the cutting edges of which cutters lie transversely of said axis, and cutter-actuating means for advancing the several cutters towards the said axis while they are being moved by the reciprocatory means in the direction of feed of the tube, which cutter-actuating means comprises a ring through which said axis extends, which ring is rotatable in said frame and has cam portions operatively connected with the cutters, and means for imparting angular movement to the said ring for advancing and retracting the cutters.

4. Apparatus for cutting a tube into lengths, comprising in combination a frame, a plurality of cutters movably mounted thereon at opposite sides of, and directed towards an axis substantially co-axial with the longitudinal axis of the tube to be cut, the cutting edges of which cutters lie transversely of said axis and cutter-actuating means for advancing the several cutters towards and retracting the same away from the said axis, which cutter-actuating means comprises a ring through which said axis extends, which ring is rotatable in said frame and has cam portions operatively connected with the cutters, and means for imparting angular movement to the said ring for advancing and retracting the cutters, comprising a lever that is mounted to rock about an axis parallel with the axis of the tube, and is so connected to said ring as to permit the latter to move towards and away from the lever while it is being rotated.

5. Apparatus for cutting a tube into lengths, comprising in combination a frame, a plurality of cutters movably mounted thereon at opposite sides of, and directed towards an axis substantially co-axial with the longitudinal axis of the tube, the cutting edges of which cutters lie transversely of said axis, cutter-actuating means for advancing the several cutters towards and retracting the same away from the said axis, which frame is mounted to move in the direction of length of said axis, reciprocatory means arranged to reciprocate said frame in said direction, and two cams rotatable at the same speed, one of which cams is arranged to control said reciprocatory means, and the second is arranged to control the cutter-actuating means.

6. Apparatus for cutting a tube into lengths, comprising in combination a frame, two cutters in the form of press dies mounted on said frame to reciprocate towards and away from one another at opposite sides of the tube or of a length cut therefrom, and cutter-actuating means for advancing the press dies towards and retracting the same away from the tube or tube-length, which press dies are arranged, when actuated, to pinch and thereby close the tube or tube-length and sever or substantially sever it, which cutter-actuating means comprises rotary toothed gearing operatively connected with said cutters, and means for adjusting the connection of one of the cutters with the gearing in relation to the connection of the other cutter therewith.

7. Apparatus for cutting a tube into lengths, comprising in combination a frame, two cutters in the form of press dies mounted on said frame to reciprocate towards and away from one another at opposite sides of the tube or of a length cut therefrom, and cutter-actuating means for advancing the press dies towards and retracting the same away from the tube or tube length which press dies are arranged, when actuated, to pinch and thereby close the tube or tube-length and sever or substantially sever it, which cutter-actuating means comprises rotary toothed gearing that is operatively connected with said cutters and comprises two toothed racks allotted each to one of the cutters, two rotary toothed members meshing each with one of said racks, and a gear wheel which is arranged to drive one of said toothed members and is co-axial with the second toothed member, which second toothed member is arranged to be driven by and is adjustable angularly in relation to said gear wheel.

8. For use in making hollow articles from a length of tubing, a machine comprising the combination with an apparatus for cutting into lengths a tube moving in the direction of its length, of a second apparatus arranged to receive a tube length from the first-mentioned apparatus, and sever or substantially sever the same, both of which apparatuses move in unison in the direction of movement of the tube during the cutting and severing operations.

9. For use in making hollow articles from a length of tubing, a machine comprising the combination with an apparatus for cutting into lengths a tube moving in the direction of its length, of a second apparatus arranged to receive a tube-length from the first-mentioned apparatus, and sever or substantially sever the same, each of which apparatus comprises cutters mounted to reciprocate towards and away from an axis substantially co-axial with the longitudinal axis of the tube to be cut, and cutter-actuating means for advancing the cutters towards and retracting the same away from said axis, all of which cutters are arranged to be reciprocated in the direction of length of the tube to be severed by them.

10. For use in making hollow articles from a length of tubing, a machine comprising the combination with an apparatus for cutting into lengths a tube moving in the direction of its length, comprising in combination a frame, a plurality of cutters movably mounted thereon at opposite sides of, and directed towards an axis substantially co-axial with the longitudinal axis of the tube, the cutting edges of which cutters lie transversely of said axis, cutter-actuating means for advancing the several cutters towards and retracting the same away from the said axis, which frame is mounted to move in the direction of length of said axis, and reciprocatory means arranged to reciprocate said frame in said direction, of a second apparatus arranged to receive a tube-length from the first-mentioned apparatus and sever or substantially sever the same, which second apparatus comprises a frame, two cutters in the form of press dies mounted on said frame to reciprocate towards and away from one another at opposite sides of said axis, cutter-actuating means for advancing the press dies towards and retracting the same away from the axis, which press dies are arranged, when actuated, to pinch and thereby close the tube or tube-length and sever or substantially sever it, and reciprocatory means arranged to reciprocate the latter frame in said direction; and a cam shaft, three cams carried by the latter, one of which cams is arranged to actuate said reciprocatory means, and the other two cams are arranged respectively to operate in unison the said cutter-actuating means of the two apparatuses.

11. Apparatus for cutting a tube into lengths, comprising in combination a frame, two cutters in the form of press dies mounted on said frame to reciprocate towards and away from one another at opposite sides of the tube or of a length cut therefrom, and cutter-actuating means for advancing the press dies towards and retracting the same away from the tube or tube-length, which press dies are arranged, when actuated, to pinch and thereby close the tube or tube length and sever or substantially sever it, which two press dies are bevelled along curved lines to enable them to press together the contiguous edges of severed or substantially severed portions of the tube to effect sealing of the said edges, and each is provided with an edge which forms, with the aforesaid bevel, a cutting edge to bite away the portions of the tube that are not intended to remain part of the finished blank, which dies are so formed and arranged that the tube between them can be bitten between its ends and severed or substantially severed to provide on the bitten edges, at the adjacent ends of the severed portions, a convex periphery.

12. Apparatus for cutting a tube into lengths, comprising in combination a frame, two cutters in the form of press dies mounted on said frame to reciprocate towards and away from one another at opposite sides of the tube or of a length cut therefrom, and cutter-actuating means for advancing the press dies towards and retracting the same away from the tube or tube-length, which press dies are arranged, when actuated, to pinch and thereby close the tube or tube-length and sever or substantially sever it, which two press dies are bevelled along curved lines to enable them to press together the contiguous edges of severed or substantially severed portions of the tube to effect sealing of the said edges, and each is provided with an edge which forms, with the aforesaid bevel, a cutting edge to bite away the portions of the tube that are not intended to remain part of the finished blank, which dies are so formed and arranged that the tube between them can be bitten between its ends and severed or substantially severed to provide on the bitten edges, at the adjacent ends of the severed portions, a convex periphery; each of which press dies has two convex cutting edges which lie close together in reversed positions with their concavities facing in opposite directions so that, as viewed in plan, they substantially form an X.

13. Apparatus for cutting a tube into lengths, comprising in combination a frame, two cutters in the form of press dies mounted on said frame to reciprocate towards and away one from another at opposite sides of the tube or of a length cut therefrom, and cutter-actuating means for advancing the press dies towards and retracting the same away from the tube or tube-length, which press dies are arranged, when actuated, to pinch and thereby close the tube or tube-length, and sever or substantially sever it, which two press dies are bevelled along curved lines to enable them to press together the contiguous edges of severed or substantially severed portions of the tube to effect sealing of the said edges, and each is provided with an edge which forms, with the aforesaid bevel, a cutting edge to bite away the portions of the tube that are not intended to remain part of the finished blank, which dies are so formed and arranged that the tube between them can be bitten between its ends and severed or substantially severed to provide on the bitten edges, at the adjacent ends of the severed portions, a convex periphery; each of which press dies has two convex cutting edges which lie close together in reversed positions with their concavities facing in opposite directions so that as viewed in plan they substantially form an X, and two press members are arranged one at each side of a press die in the V-shaped portions thereof for removing superfluous material that is bitten off or spewed out laterally.

14. Apparatus for cutting a tube into lengths, comprising in combination a frame, a plurality of cutters movably mounted thereon at opposite sides of, and directed towards an axis substantially co-axial with the longitudinal axis of the tube to be cut, the cutting edges of which cutters lie transversely of said axis, cutter-actuating means for advancing the several cutters towards and retracting the same away from the said axis, which frame is mounted to move in the direction of length of said axis, reciprocatory means arranged to reciprocate said frame in said direction for imparting a motion of translation to the cutters in the direction of the tube, and driving means for the reciprocatory means comprising variable speed gear for adjusting the rate of said motion of translation to the rate of movement of the tube.

15. A method of making rubber blanks from a tube for use in the manufacture of hollow rubber articles, comprising the steps of cutting the tube successively into tube-lengths, and severing or substantially severing a preceding cut-off tube-length at a situation between its ends so as to close the ends of the severed parts at the place of severance, in timed relation to the operation of cutting off a following tube-length.

16. A method of making rubber blanks from a tube for use in the manufacture of hollow rubber articles, comprising the steps of cutting the tube successively into tube-lengths, and severing or substantially severing a preceding cut-off tube-length at a situation between its ends so as to close the ends of the severed parts at the place of severance along a line of closure that intersects the central longitudinal axis of the tube-length, in timed relation to the operation of cutting off a following tube-length.

17. A method of making rubber blanks from a tube for use in the manufacture of hollow rubber articles, comprising the steps of cutting the tube successively into tube-lengths, and severing or substantially severing a preceding cut-off tube-length at a situation between its ends so as to close the ends of the severed parts at the place of severance along a curved line of closure that intersects the central longitudinal axis of the cut-off tube length, in timed relation to the operation of cutting off a following tube-length.

18. A method of making rubber blanks from a tube for use in the manufacture of hollow rubber articles, comprising the steps of cutting the tube successively into tube-lengths, and severing or substantially severing a preceding cut-off tube-length at a situation between its ends so as to close the ends of the severed parts at the place of severance along two curved lines in timed relation to the operation of cutting off a following tube-length, each of said curved lines being an arc having a chord at right angles to the central longitudinal axis of the cut-off tube-length.

19. A method of making rubber blanks from a tube for use in the manufacture of hollow rubber articles, comprising the steps of cutting the tube successively into tube-lengths, and severing or substantially severing a preceding cut-off tube-length midway between its ends so as to close the ends of the severed parts at the place of severance, in timed relation to the operation of cutting off a following tube-length.

FRANK COURTENAY MATTHEWS.
FREDERICK EDWARD BROWN.
JOHN WILLIAM HENRY PENGELLY.